United States Patent
Lewis et al.

(10) Patent No.: US 9,806,884 B2
(45) Date of Patent: Oct. 31, 2017

(54) SYSTEM AND METHOD FOR CRYPTOGRAPHIC KEY IDENTIFICATION

(71) Applicant: Robert Bosch GmbH, Stuttgart (DE)

(72) Inventors: Matthew Lewis, Reutlingen (DE); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 14/593,469

(22) Filed: Jan. 9, 2015

(65) Prior Publication Data

US 2016/0359627 A1    Dec. 8, 2016

Related U.S. Application Data

(60) Provisional application No. 61/925,879, filed on Jan. 10, 2014.

(51) Int. Cl.
*H04L 9/08* (2006.01)
*G09C 1/00* (2006.01)

(52) U.S. Cl.
CPC .............. *H04L 9/0866* (2013.01); *G09C 1/00* (2013.01); *H04L 9/0877* (2013.01)

(58) Field of Classification Search
CPC .................................................... H04L 9/0866
See application file for complete search history.

(56) References Cited

U.S. PATENT DOCUMENTS

| | | | | |
|---|---|---|---|---|
| 6,188,322 B1* | 2/2001 | Yao | ....... | G01R 15/148 324/658 |
| 8,516,269 B1* | 8/2013 | Hamlet | ....... | G06F 21/445 340/5.8 |
| 8,525,169 B1* | 9/2013 | Edelstein | ....... | H01L 23/544 257/48 |
| 8,531,250 B1* | 9/2013 | Luschas | ....... | H03B 5/1228 257/531 |
| 8,661,371 B1* | 2/2014 | Wang | ....... | G06F 17/5068 716/52 |
| 8,741,713 B2* | 6/2014 | Bruley | ....... | H01L 22/34 257/639 |
| 8,775,983 B1* | 7/2014 | Wang | ....... | G03F 7/70433 716/52 |
| 9,245,799 B2* | 1/2016 | Barth | ....... | H01L 23/481 |
| 2003/0123046 A1* | 7/2003 | Heaton | ....... | G05B 19/404 356/27 |
| 2005/0270014 A1* | 12/2005 | Zribi | ....... | G01R 33/0283 324/126 |
| 2007/0200549 A1* | 8/2007 | Berkcan | ....... | G01R 15/148 324/117 R |

(Continued)

OTHER PUBLICATIONS

English et al., Mems-assisted cryptography for cpi protection, 2007, IEEE Security & Privacy, vol. 5, No. 4, pp. 14-21.*

*Primary Examiner* — Beemnet Dada
*Assistant Examiner* — Stephen Gundry
(74) *Attorney, Agent, or Firm* — Maginot Moore & Beck LLP

(57) ABSTRACT

A system includes a MEMS device and a key generating device formed over the substrate. The key generating device is configured to generate a cryptographic key based on a property of the MEMS device and the MEMS device is configured to output a signal indicative of a sensed parameter. The generated cryptographic key is based on the influenced output signal of the MEMS device.

15 Claims, 5 Drawing Sheets

(56) References Cited

U.S. PATENT DOCUMENTS

| | | | | |
|---|---|---|---|---|
| 2008/0262788 A1* | 10/2008 | Schrijen | H04L 9/0866 | 702/155 |
| 2009/0265758 A1* | 10/2009 | Tuyls | G06F 21/31 | 726/2 |
| 2010/0085075 A1* | 4/2010 | Luzzi | H04L 9/0866 | 326/8 |
| 2011/0099117 A1* | 4/2011 | Schepers | G06F 21/305 | 705/318 |
| 2011/0210104 A1* | 9/2011 | Wahlsten | G03F 7/70383 | 219/121.69 |
| 2012/0020145 A1* | 1/2012 | Huber | G06F 21/72 | 365/154 |
| 2012/0092350 A1* | 4/2012 | Ganapathi | G02B 26/0833 | 345/501 |
| 2012/0097970 A1* | 4/2012 | Siomkos | H01L 23/291 | 257/76 |
| 2012/0233575 A1* | 9/2012 | Kashyap | G06F 17/5068 | 716/55 |
| 2013/0019324 A1* | 1/2013 | Tehranipoor | H03K 3/0315 | 726/34 |
| 2013/0146755 A1* | 6/2013 | Wagner | B23Q 7/06 | 250/231.13 |
| 2013/0278349 A1* | 10/2013 | Dayan | H01P 3/003 | 333/26 |
| 2013/0320554 A1* | 12/2013 | Barth | H01L 23/481 | 257/774 |
| 2014/0108786 A1* | 4/2014 | Kreft | G06F 21/71 | 713/156 |
| 2014/0117468 A1* | 5/2014 | Parris | G01N 27/221 | 257/414 |
| 2014/0118962 A1* | 5/2014 | Sabavat | H05K 1/0224 | 361/748 |
| 2014/0263646 A1* | 9/2014 | Manesh | G06K 7/084 | 235/440 |
| 2015/0137380 A1* | 5/2015 | in 't Zandt | H01L 23/564 | 257/773 |
| 2015/0192637 A1* | 7/2015 | Falk | G06F 21/55 | 326/16 |
| 2015/0380365 A1* | 12/2015 | Dyka | H01L 27/0292 | 257/774 |
| 2016/0155679 A1* | 6/2016 | Davies | H01L 23/576 | 257/693 |

* cited by examiner

SYSTEM AND METHOD FOR CRYPTOGRAPHIC KEY IDENTIFICATION

CROSS-REFERENCE TO RELATED APPLICATIONS

This application claims priority to U.S. Provisional application Ser. No. 61/925,879, filed on Jan. 10, 2014, the disclosure of which is herein incorporated by reference in its entirety.

TECHNICAL FIELD

This patent relates generally to the field of information security technology, particularly, to a method for generating cryptographic key in devices.

BACKGROUND

In general, cryptographic keys are used to maintain security for a device. The cryptographic key can be in the form of unique identifiers to maintain security for the device. In previously known systems, the cryptographic key is stored in a secure storage to maintain the security of the cryptographic key which may not be very secure. To address this issue, methods have been developed to provide a secure way to obtain the cryptographic key such as a Physical Unclonable Functions (PUFs). PUFs are physical devices that have randomness properties. Some systems use PUFs to generate the cryptographic key from the device based on a single physical property of the device. While generating the cryptographic key from the device avoids the need to store the cryptographic keys in a secure storage and reduces the cost of manufacturing, these methods can be unpredictable and the output of the method may be uncontrolled. Furthermore, in certain systems that use PUFs, different environmental conditions can provide variable responses and introduce a noise in the determination of the cryptographic key. As such, these systems have to use additional devices such as a fuzzy extractor to address the noise introduced in the measurements. However, these additional devices can increase the overhead by using additional circuitry which can take up more area. As such, improvements in a system and a method that generate a cryptographic key for a device are desirable.

SUMMARY

In order to address this need a system has been configured to generate a cryptographic key. In one embodiment, the system includes a substrate and a MEMS device formed on the substrate. The MEMS device is configured to generate an output signal that is indicative of a sensed parameter. A key generating device is also formed on the substrate. The key generating device can be configured to generate a cryptographic key based on at least one property of the sensor. The cryptographic key can be based on the influenced output signal.

In another aspect, the key generating device can selectively influence the output signal of the MEMS device using a magnetic field. The magnetic field can be generated using a coil. The cryptographic key can be generated by applying a voltage to the coil and using one property of the MEMS device that is influenced by the generated field. In another aspect, the key generating device can determine positions of elements in the MEMS device and generate the cryptographic based on the position of the elements. In another aspect, the key generating device can determine capacitances in the system surrounding the MEMS device and generate the cryptographic based on the position of the capacitances.

In another embodiment, a method that enables the generation of the cryptographic key for a MEMS system can include obtaining an output signal from the MEMS device, where the output signal is indicative of a sensed parameter. The cryptographic key can be generated using a key generating device based on the output signal. The output signal is influenced by at least one property of the MEMS device.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The disclosure also includes any alterations and modifications to the illustrated embodiments and includes further applications of the principles of the disclosed embodiments as would normally occur to one of ordinary skill in the art to which this patent pertains.

Figure 1:
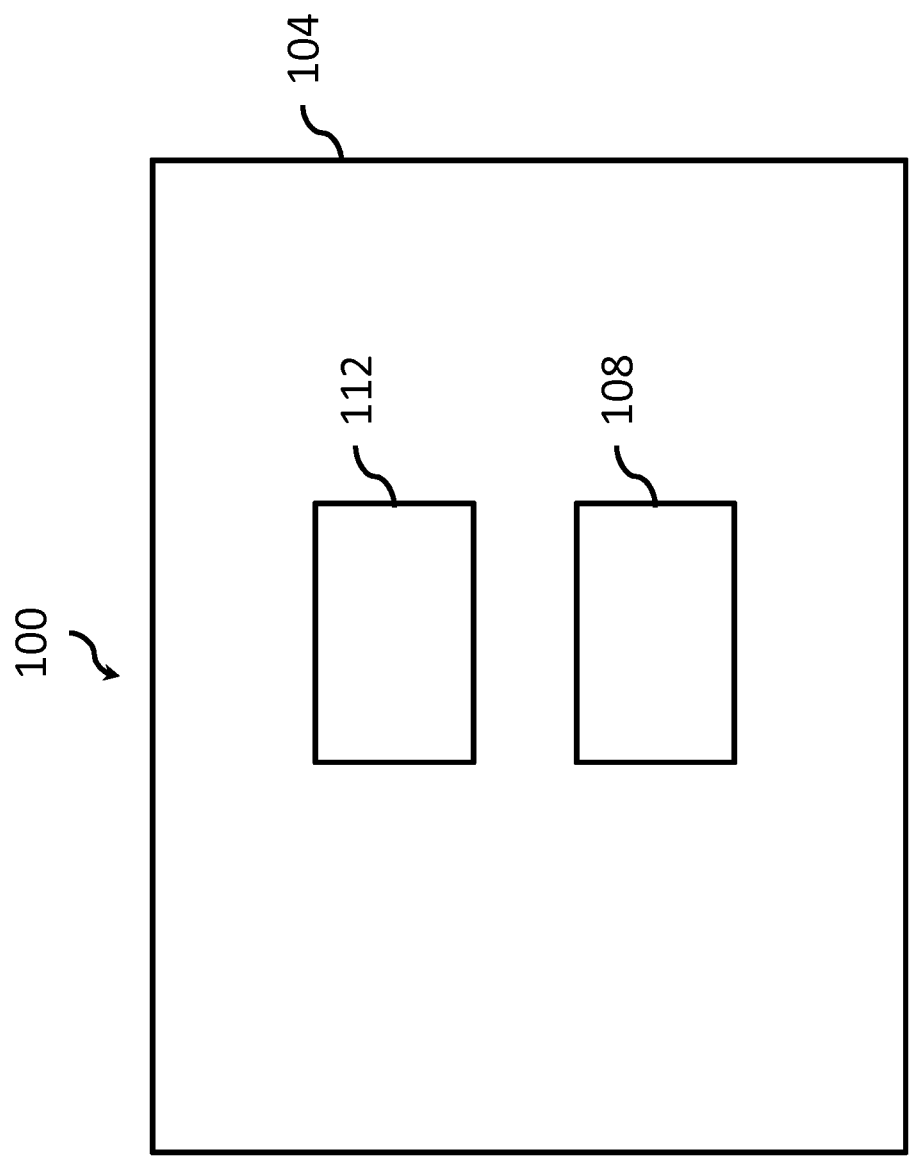
FIG. 1 depicts an exemplary system for generating a cryptographic key.

FIG. 1 depicts an exemplary system 100 according to the disclosed subject matter. The exemplary system can be a micromechanical sensor (MEMS) system. The system can include a device 108, such as a MEMS device, formed on a substrate 104 that generates an output that is indicative of a sensed parameter. The system also includes a key generating device 112 formed on the substrate 104 that is configured to generate a cryptographic key for the system 100 based on at least one property of the MEMS device 108, such as the output from the MEMS device 104.

With further reference to FIG. 1, it should be understood by the reader that examples of the MEMS device 108 can include, but are not limited to, sensors, electrical components, a combination of components, or the like. Examples of micromechanical sensors include, but are not limited to accelerometers, gyroscopes, MEMs devices with mechanical structures, a cantilever structure, capacitive-based measurement sensors, or the like. The system 100 uses logic around the MEMS device 108 to determine properties of the MEMS device 108 or receive an output from the MEMS device 108. The system 100 can then generate the cryptographic key using methodologies such as a fuzzy extractor once the physical source is obtained. Using special circuits and logic around the MEMS device 108 to generate the cryptographic key can result in structures that are easier to measure, potentially more secure and result in relatively cheaper secure secret-key storage for devices. It should also be understood by the reader that the key generating device 112 can be incorporated in the MEMS device 108, can be separate from the MEMS device 108, can be connected to the MEMS device 108, be positioned in the same chipset or a different chipset as the MEMS device 108, or the like.

With further reference to FIG. 1, in one example, the key generating device 112 is used to determine the distance of a silicon vertical interconnect access (via) of the MEMS device 108 and use the distance to generate a cryptographic key for the system 100. The key generating device 112 can be used to determine how far the silicon vias is from its center location by measuring the resistance in an X, Y pattern a generate a cryptographic key from this measurement. The distance of the silicon vias can depend on a resistive sheet that provides the X, Y distance of the vias. Since vias can be slightly different, unlimited number of vias can be used to determine a unique property of the MEMS device 108. Additionally, since vias are usually small, a large number of vias can be used in a relatively small area. It should be understood that the distance of the vias can be measured using other methods as well.

Figure 2:
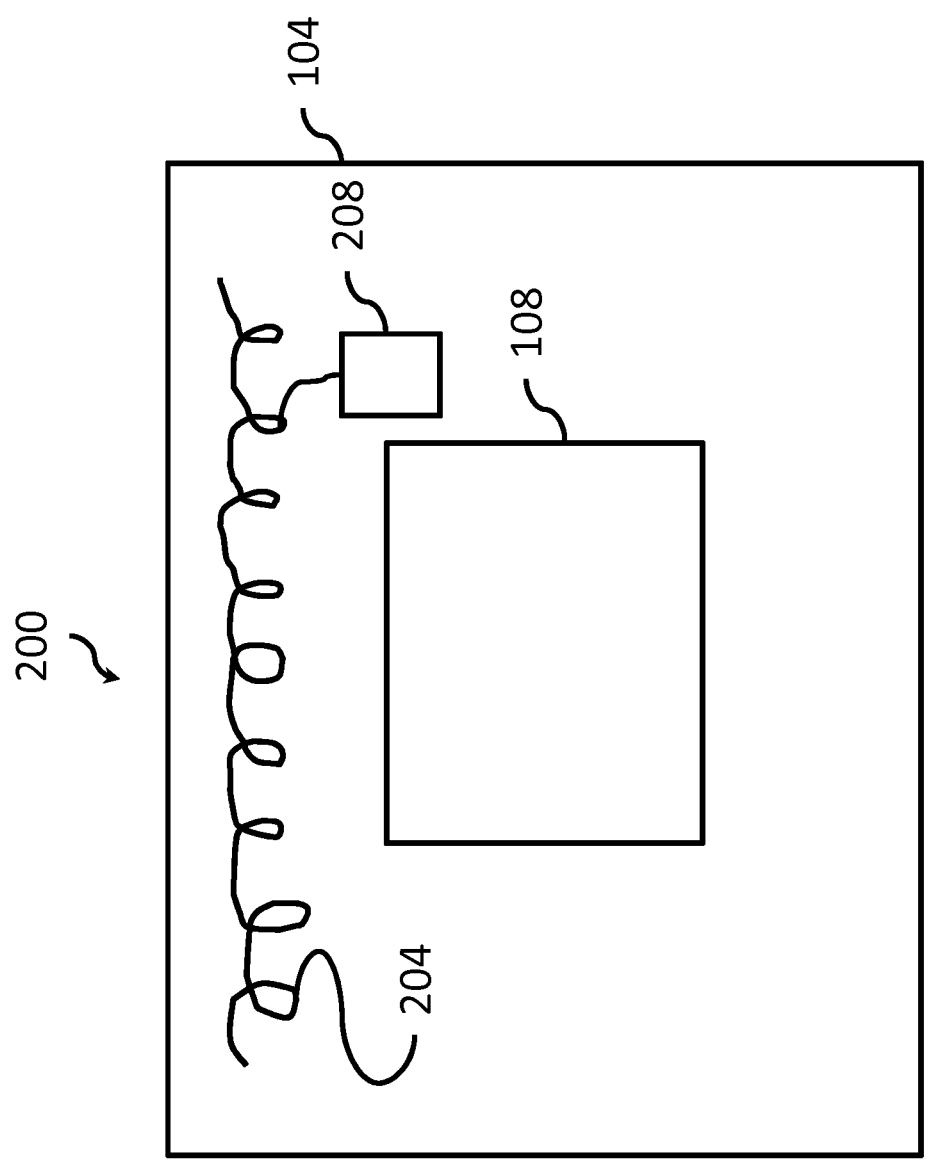
FIG. 2 is another exemplary system for generating a cryptographic key.

FIG. 2 depicts another exemplary system 200 according to the disclosed subject matter. The system 300 can include a coil 204 on the substrate 104. The coil 204 can be attached to a device 208 configured to apply a predetermined voltage to the coil 204 to output a magnetic field. In one example, the key generating device 112 can be integrated in the device 208, connected to the device 208, integrated with the MEMS device 108, or separate from the device 208 and the MEMS device 108. The magnetic field can be used to selectively influence the output signal of the MEMS device 108 using a magnetic field. The properties of the MEMS device 108 and therefore the output of the MEMS device 108 will change depending upon the current passed through the coil 204 and the magnetic field produced as a result of the current. Variations in the field produced by the coil 204 and the location of the component 204 from the device 108 allow the system 200 to measure properties of the device 108 under multiple conditions resulting in more entropy. In one example, different levels of current can be passed through the coil 204 to produce specific voltage output in the MEMS device 108. These specific voltages in the MEMS device 108 can be used as a PUF to generate a cryptographic key for the system 200. In another example, variations in the field produced by the coil 204 and the location of the coil 204 from the MEMS device 108 allow the system 200 to measure properties of the MEMS device 108 under multiple conditions resulting in more entropy. A cryptographic key for the system 200 can be generated based on varying the field produced by the coil 204 and the location of the coil 204. In another example, the system 200 can contain elements, such as Hall elements, whose voltages (such as offset, hall voltage, or the like) can depend upon the location and the direction of the magnetic field and on the applied voltage to the MEMS device 108. These voltages can be used to generate a cryptographic key for the system 200. In another example, multiple MEMS devices 108, such as 9 MEMS devices 108, can be introduced in a single chip to allow the system 200 to measure properties of specific sensors while manipulating the other sensors. The coil 204 can be formed either surrounding the MEMS device 108, on a portion of the substrate 104 not surrounding the MEMS device 108, positioned in the same chipset, positioned in a different chipset, or the like.

Figure 3:
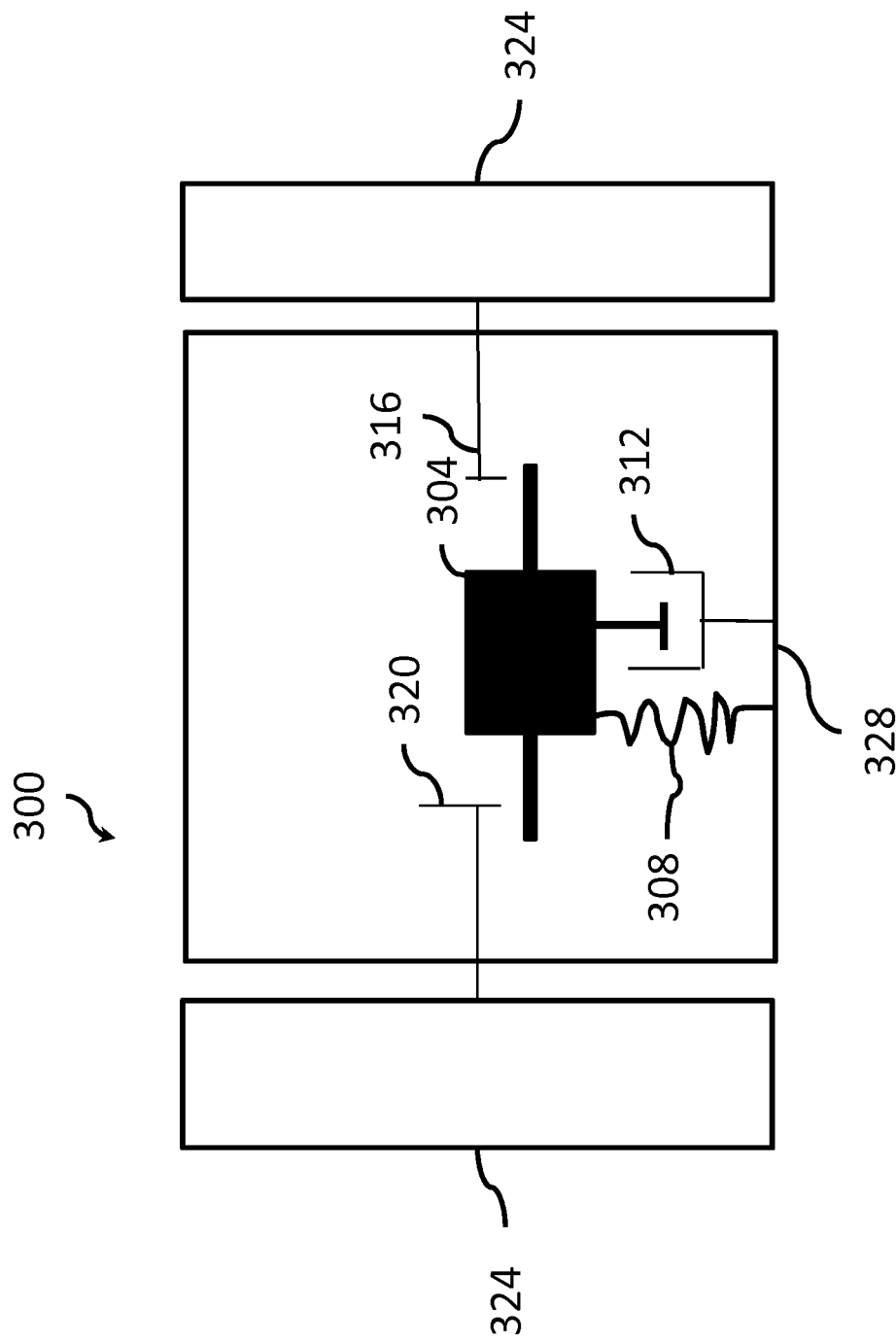
FIG. 3 is another exemplary system for generating a cryptographic key.

FIG. 3 depicts another exemplary system 300 according to the disclosed subject matter. The system 300 includes a MEMS device 328. The MEMS device 328 can be an accelerometer or the like. In the exemplary system 300, the MEMS device 328 includes a mass 304 suspended on one or more micro-mechanical springs 308. The springs 308 allow the mass to move more freely. A terminal 312 configured to measure a characteristic of the mass 304, for example, capacitance, is attached to the mass 304 and additional terminals 316 and 320 are positioned on either side of the mass 304, for example one terminal 320 on the left side of the mass 304 and one terminal 316 of the right side of the mass 304. These terminals 320, 316 can be configured to measure a characteristic of the mass 304, for example, capacitance. A key generating device 324 is attached to the terminal 316 and 320 to determine change in properties of the MEMS device 328. When the system 300 is subjected to acceleration, a force acts on the mass 304 causing the mass 304 to move. This movement is sensed by the key generating device 324 using the terminals 308, 316, and 320. The key generating device 324 can also measure capacitances between terminals 316 and 312 and terminals 320 and 312 and convert them into an equivalent electrical current. The key generating device 324 can generate a cryptographic key based on the measured capacitances. The MEMS device 328 illustrated in FIG. 3 in a multiple acceleration sensor, but it should be understood that other acceleration sensors or other devices can be used as well. It should also be understood by the reader that more sets of terminals can be positioned around the mass 304 and the MEMS device 328 can be used as a mechanical switch. Since a constant spring 308 is connected to the mass 304, the acceleration of the device 328 can be measured in one direction. Other devices 104 may be able to measure accelerations in multiple directions as well.

Figure 4:
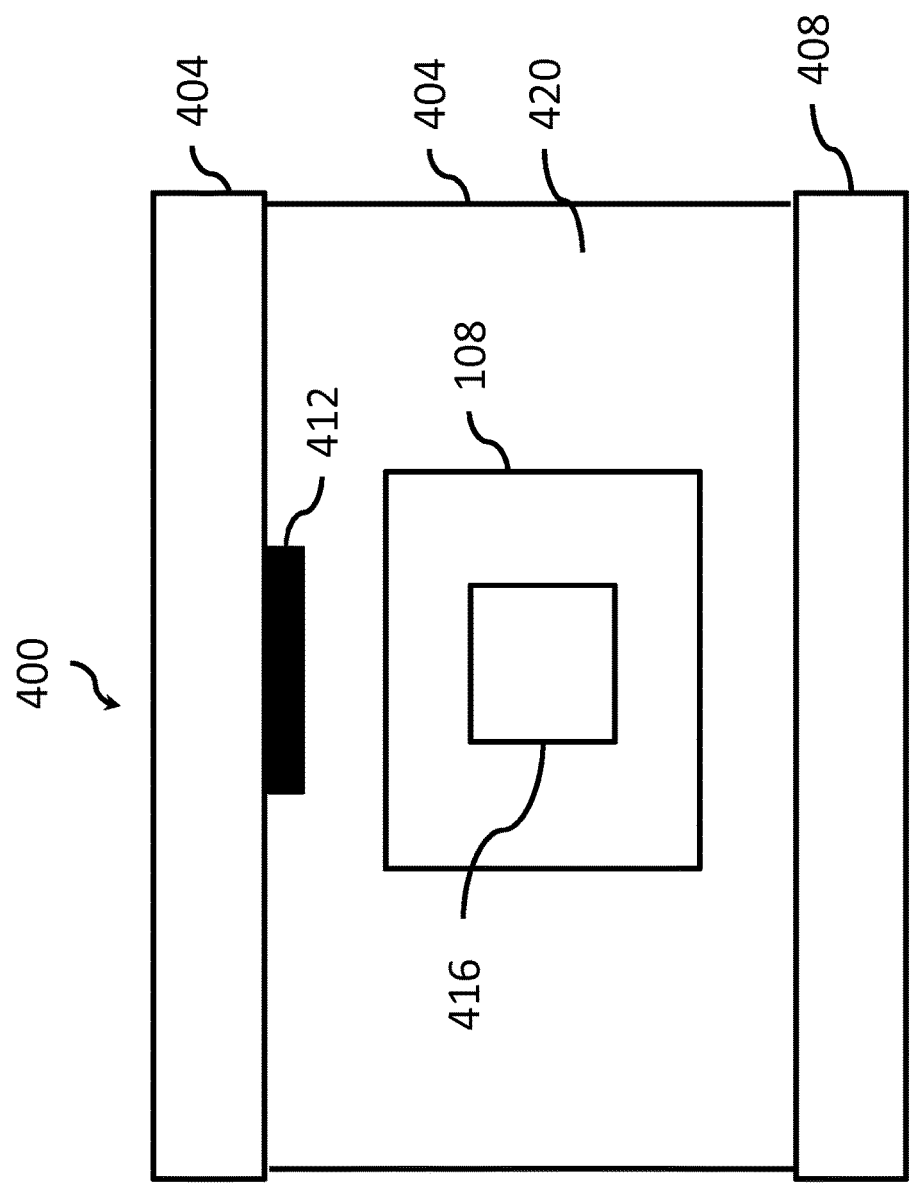
FIG. 4 is another exemplary system for generating a cryptographic key.

FIG. 4 depicts another exemplary system 400 according to the disclosed subject matter. The MEMS device 108 is positioned between a cap wafer 404 and a substrate 408. The substrate 408 can also be a sensor wafer. The area 420 can be filled with a predetermined gas having a predetermined pressure. The cap wafer 404 can have a metal 412 on it. A capacitance exists between the cap wafer 404 and the substrate 408. The value of this capacitance will depend on different properties of the MEMS device 108. A key generation device 416, either incorporated inside the MEMS device 108 or positioned near the MEMS device 108, can use the capacitance value to generate a cryptographic key for the system 400. When the system 400 is taken apart, the capacitance can be disrupted.

With further reference to FIG. 4, the MEMS device 108 may be located within or include an enclosed area 420 such as a gap having a fluid contained therein. Examples of the fluid include, but are not limited to, air, gas, a combination of different fluids, or the like. The fluid may be configured to have a predetermined characteristic, such as pressure, dielectric constant, or the like. Alternatively, according to another embodiment, the MEMS device 108 may be submerged in a fluid or gas having a randomized characteristic and is configured to modify properties of the MEMS device 108. For example, the fluid can be configured to have a randomized dielectric constant. A fluid having a randomized dielectric constant can be implemented by introducing a randomized quantity of a dielectric substance in the enclosed area 420. Examples of properties of the MEMS device 108 that can be modified include, but are not limited to, the damping factor, capacitance measurements, or the like. By modifying the different properties of the MEMS device 108 using the fluid, the key generating device 416 system can generate a cryptographic key for the system 100. In another example, for a capacitive-based measurement MEMS device 108, random dielectric material can be added to the cavity of the pressure MEMS device 108.

Figure 5:
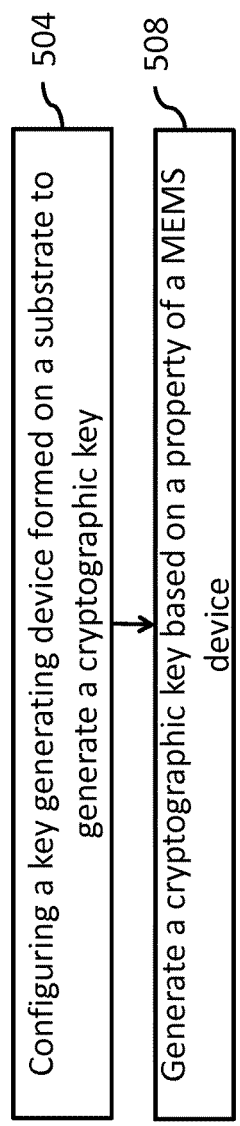
FIG. 5 an exemplary process of generating a key for a device in a MEMS system.

FIG. 5 illustrates an exemplary process of determining a cryptographic key for a MEMS device 108, 328 in a system. The exemplary process can be used in any of the systems described herein. The key generating device 112, 204, 324, 416 is configured to generate a cryptographic key (Step 504). The cryptographic key can be generated based on a property of the MEMS device 108, 328 (Step 508). The property of the MEMS device 108, 328 can change based on a change in logic around the MEMS device 108, 328. The process uses multiple features of the system as opposed to a single feature that can allow the system to determine a unique and reliable key for the MEMS device 108, 328. The features can be relatively easy to measure. This process can also allow the system to determine a cryptographic key as opposed to a fingerprint integrated with a crypto functionality. The exemplary process involves measuring multiple physical properties, correcting errors with respect to a previous version of the physical property and computing a uniform string. In one example, the exemplary process passes physical measurements through a component, such as a robust fuzzy extractor device.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by one of ordinary skill in the art that are also intended to be encompassed by the following embodiments.

What is claimed is:

1. A micromechanical sensor (MEMS) system comprising:
   a substrate;
   a MEMS device formed on the substrate and configured to generate an output signal indicative of a sensed parameter, the MEMS device including at least one via; and
   a key generating device formed on the substrate and configured to generate a cryptographic key based on a distance of the at least one via from at least one predetermined location of the MEMS device.

2. The system of claim 1, wherein the key generating device is configured to influence the output signal of the MEMS device, and
   wherein the cryptographic key is further based on the influenced output signal.

3. The system of claim 2, wherein the key generating device is configured to generate a magnetic field, and
   wherein the key generating device is configured to selectively influence the output signal of the MEMS device using the magnetic field.

4. The system of claim 3, wherein the MEMS device comprises an accelerometer.

5. The system of claim 3, wherein the key generating device includes a circuit, the circuit including (i) a coil configured to generate the magnetic field and (ii) a test circuit configured to apply at least one predetermined voltage to the coil.

6. The system of claim 1, wherein the key generating device is configured to measure distances of a plurality of vias of the MEMS device from the at least one predetermined location and to generate the cryptographic key based on the measured distances of the vias.

7. The system of claim 1, wherein the key generating device is configured to determine a resistance associated with the at least one via and to determine the distance based on the determined resistance.

8. The system of claim 1, wherein the system includes a cap structure that is formed to the substrate over the MEMS device, and
   wherein the key generating device is configured to measure a capacitance between the cap structure and the substrate and to generate the cryptographic key further based on the measured capacitance.

9. The system of claim 1, wherein the MEMS device is enclosed in space on the substrate,
   wherein the space is filled with a fluid, and
   wherein the fluid has a randomized dielectric constant.

10. A method generating a cryptographic key for a MEMS system including a via, the method comprising:
    determining a distance between the via of the MEMS system and a predetermined location of the MEMS device;
    generating the cryptographic key using a key generating device of the MEMS system based on the distance.

11. The method of claim 10, further comprising:
    generating a magnetic field using the key generating device; and
    selectively influencing, using the key generating device, the property of the MEMS device using the generated magnetic field.

12. The method of claim 11, further comprising:
    generating the magnetic field using a coil; and
    selectively influencing, using the key generating device, property of the MEMS device using the generated magnetic field.

13. The method of claim 11, further comprising:
    generating the cryptographic key based on the influenced property of the MEMS device.

14. The method of claim 10, further comprising:
    measuring, using the key generating device, a resistance of the at least one via of the MEMS device to determine the distance based on the determined resistance.

15. The method of claim 10, further comprising:
    measuring, using the key generating device, a capacitance between a cap structure and the substrate, wherein the MEMS device is positioned between the cap structure and the substrate; and
    generating the cryptographic key based on the measured capacitance.

* * * * *